(12) United States Patent
Ferrell

(10) Patent No.: US 6,945,655 B1
(45) Date of Patent: Sep. 20, 2005

(54) CONVECTION COOLED LIGHT PROJECTOR

(76) Inventor: Brad Ferrell, P.O. Box 6, Moore, SC (US) 29366

( * ) Notice: Subject to any disclaimer, the term of this patent is extended or adjusted under 35 U.S.C. 154(b) by 0 days.

(21) Appl. No.: 10/662,153

(22) Filed: Sep. 12, 2003

Related U.S. Application Data

(63) Continuation-in-part of application No. 10/444,040, filed on May 21, 2003, now abandoned.

(51) Int. Cl.[7] .................. G03B 21/14; G03B 21/22; G03B 21/16; G02F 1/1335
(52) U.S. Cl. ................. 353/119; 353/52; 353/61; 349/5; 349/6
(58) Field of Search .................. 353/4, 11–14, 22, 353/35, 39, 42, 43, 52, 57, 60, 61, 62, 97, 353/119; 349/5, 6, 7, 12, 58

(56) References Cited

U.S. PATENT DOCUMENTS

| | | | |
|---|---|---|---|
| 3,610,747 A * | 10/1971 | Bickel | 353/61 |
| 3,711,194 A | 1/1973 | Wilson, Jr. | 353/99 |
| 4,880,303 A | 11/1989 | Grunwald | 353/122 |
| 4,882,599 A | 11/1989 | Grunwald | 353/60 |
| 4,904,079 A | 2/1990 | Yoshimura et al. | 353/122 |
| 5,300,942 A * | 4/1994 | Dolgoff | 345/32 |
| 5,682,216 A * | 10/1997 | Lin et al. | 349/122 |
| 5,683,160 A | 11/1997 | Fukaya et al. | 353/57 |
| 5,842,761 A * | 12/1998 | Futakami et al. | 353/119 |
| 5,889,614 A * | 3/1999 | Cobben et al. | 359/483 |
| 6,104,536 A * | 8/2000 | Eckhardt | 359/619 |
| 6,764,184 B1 * | 7/2004 | Carkner | 353/119 |

* cited by examiner

Primary Examiner—Judy Nguyen
Assistant Examiner—Andrew Sever

(57) ABSTRACT

A convection cooled liquid crystal display panel projector having a low wattage light source. The projector consist of a housing with a plurality of louvered vents preventing light from escaping from the housing while allowing air to circulate there through. A primary lens configuration having a light source, and a liquid crystal display panel, a Fresnel lens and a projector mirror. An overhead lens configuration by said light source and a Fresnel lens and liquid crystal display panel with a mirror in spaced relation thereto.

6 Claims, 8 Drawing Sheets

CONVECTION COOLED LIGHT PROJECTOR

This patent application is a continuation in part of Ser. No. 10/444,040, Filed May 21, 2003, now abandoned.

BACKGROUND OF THE INVENTION

1. Technical Field

The present invention relates to convection-cooled projectors and more particularly to employing a low illuminance lamp as a light source used in conjunction with a screen with a high gain rating.

2. Description of Prior Art

Prior art projectors in general use LCD panel projectors comprises a fan cooled box-like housing which supports an illumination lamp, an LCD panel bearing an image to be projected and various configurations of lenses used to magnify the image on the LCD panel. The exhaust fan is incorporated in the housing or exhausting air inside the housing through the air outlet. An 800 Watt to 1000 Watt projection light source is also provided in the housing for illuminating LCD panel. A projection lens is provided for projecting a magnified image on the LCD panel onto a remote viewing surface such as a screen and includes a focusing lens and may include a reflecting mirror for focusing and directing the image from the LCD panel to the screen. The projector of the above-described type recently employs a high illuminance lamp, for example, a halogen lamp, as the light source so that the visibility of the enlarged image projected on the screen can be improved. In this case, however, LCD panel placed would be subjected to high energy heat rays produced by the high illuminance lamp such that the LCD panel goes above 45 degrees Centigrade at which point it ceases to function properly. The use of a low illuminance lamp in conjunction with a high gain screen eliminates the need for a cooling fan. Means need to be provided enhancing convection cooling to stop heat buildup in the projector housing.

In the conventional projectors of the transmissive LCD panel type, air heated by the heat rays from the light source is exhausted by the exhaust fan of the housing. Furthermore, a cold mirror which reflects light energy but few heat rays is employed as a spherical reflecting mirror mounted in the rear of or below the lamp. Moreover, a heat ray-reflecting filter is interposed between the lamp and the Fresnel lens.

Transmissive LCD panels are used with the above described overhead projectors, however, the LCD panels must not heat up to above 45C or they will cease to function. Some LCD projectors have built in fans to provide additional cooling in addition to the cooling fans built into the conventional projectors utilizing high luminance lamps. These LCD panels functionality is easily degraded by heat. Furthermore, dark colored portions of a projected area of the transmissive LCD panels absorb heat rays. Consequently, the above-described conventional means cannot provide sufficient prevention of temperatures above 45C if a secondary fan is not included in the transmissive LCD panel. Use of the low illuminance lamp allows the removal of the need for the secondary fan in the transmissive LCD panel. See for example U.S. Pat. Nos. 3,711,194, 4,880,303, 4,882,599, and 4,904,079.

U.S. Pat. No. 3,711,194 an overhead projection apparatus is disclosed having a housing with a lamp casing therein for projecting a light beam onto a reflective surface that directs a beam upwardly through a film onto a lens assembly for projection of an image onto a screen.

U.S. Pat. No. 4,880,303 is directed towards an overhead projector having a housing with a Fresnel lens, a lamp is positioned within the housing to provide illumination to a liquid crystal display framed in a hinge mounting on the side of the housing which can be positioned down an operative position overlying a Fresnel lens. A projection lens is positioned in spaced relation to the LCD panel and a reflective mirror surface is provided for the output of the projection lens.

U.S. Pat. No. 4,882,599 an overhead projector is illustrated having a housing configuration with an internal light source and lens plus an internal reflective mirror which reflects an image up through a liquid crystal display and then through a projection lens and an angular image mirror thereabove.

U.S. Pat. No. 4,904,709 a liquid crystal display device for overhead projector is illustrated and described in which a liquid crystal lens display is sandwiched between protective plates which are separated from the cell surface to form an air passage provided with a fan so that an airflow can be directed there through which will come in direct contact with the cell cooling same.

Finally, in U.S. Pat. No. 5,683,160 an overhead projector with light illumines lamp as a light source is disclosed in which a housing is illustrated having a light source and mirror within and a pair of air inlets and outlets formed in the respective sidewalls with an exhaust fan incorporated within the housing to provide a cooling flow of air over the projected lens surface.

SUMMARY OF THE INVENTION

Therefore, an object of the present invention is to provide a projector wherein quieter operation can be obtained by employment of a low illumines projection lamp and transmissive LCD panel can be prevented from achieving temperatures greater than 45 degrees Celsius with simple quiet convection cooling.

To achieve the object, the present invention provides a projector comprising a housing including a transmissive LCD panel bearing an image to be projected and air vents provided in the sidewalls of the projector housing. A low wattage projection light source is provided in the housing for illuminating the transmissive LCD panel such that convection cooling method of the invention is sufficient to keep the temperature of the LCD panel below 45C. Either of two general types of lens configurations are used.

DESCRIPTION OF THE PREFERRED EMBODIMENT

Figure 1:
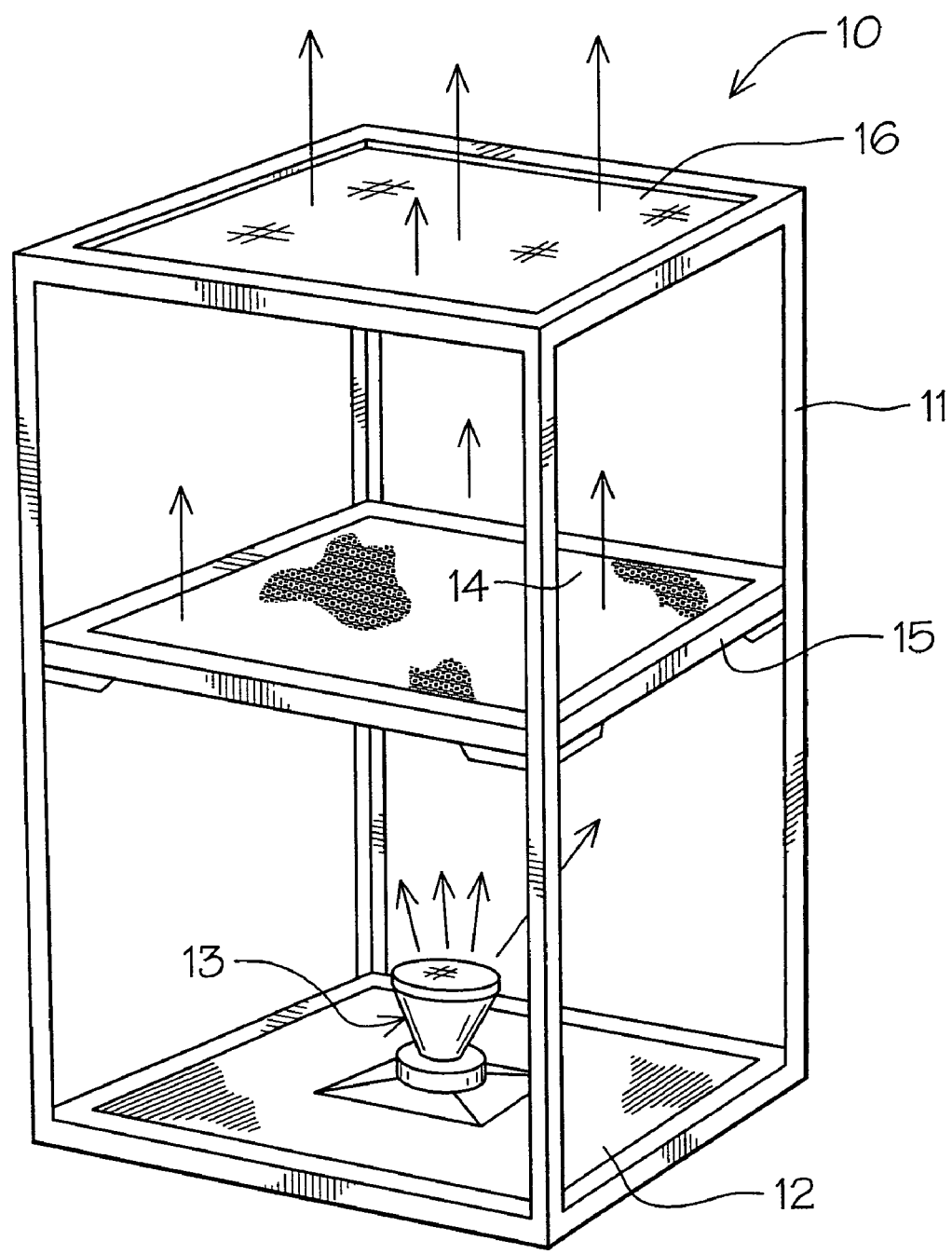
FIG. 1 is a perspective view of the lens configuration of the invention for a vertical TV projector application of the convection-cooling device.

Referring now to FIG. 1 of the drawings, a graphic illustration shows the basic elements of a convection-cooling projector 10 of the invention. The projector 10 has a main support frame 11 defining a rectangular enclosure with a base 12 having a projector light source 13 thereon. A liquid crystal display (LCD) image panel 14 is positioned within a support frame 15 in the main frame 11 in vertical spaced relation to the base 12. A projection lens 16 (of a Fresnel type) is positioned in spaced vertical alignment within the main frame 11 so as to receive and project the images produced by the (LCD) panel 14 as will be well known and understood by those skilled in the art.

Figure 2:
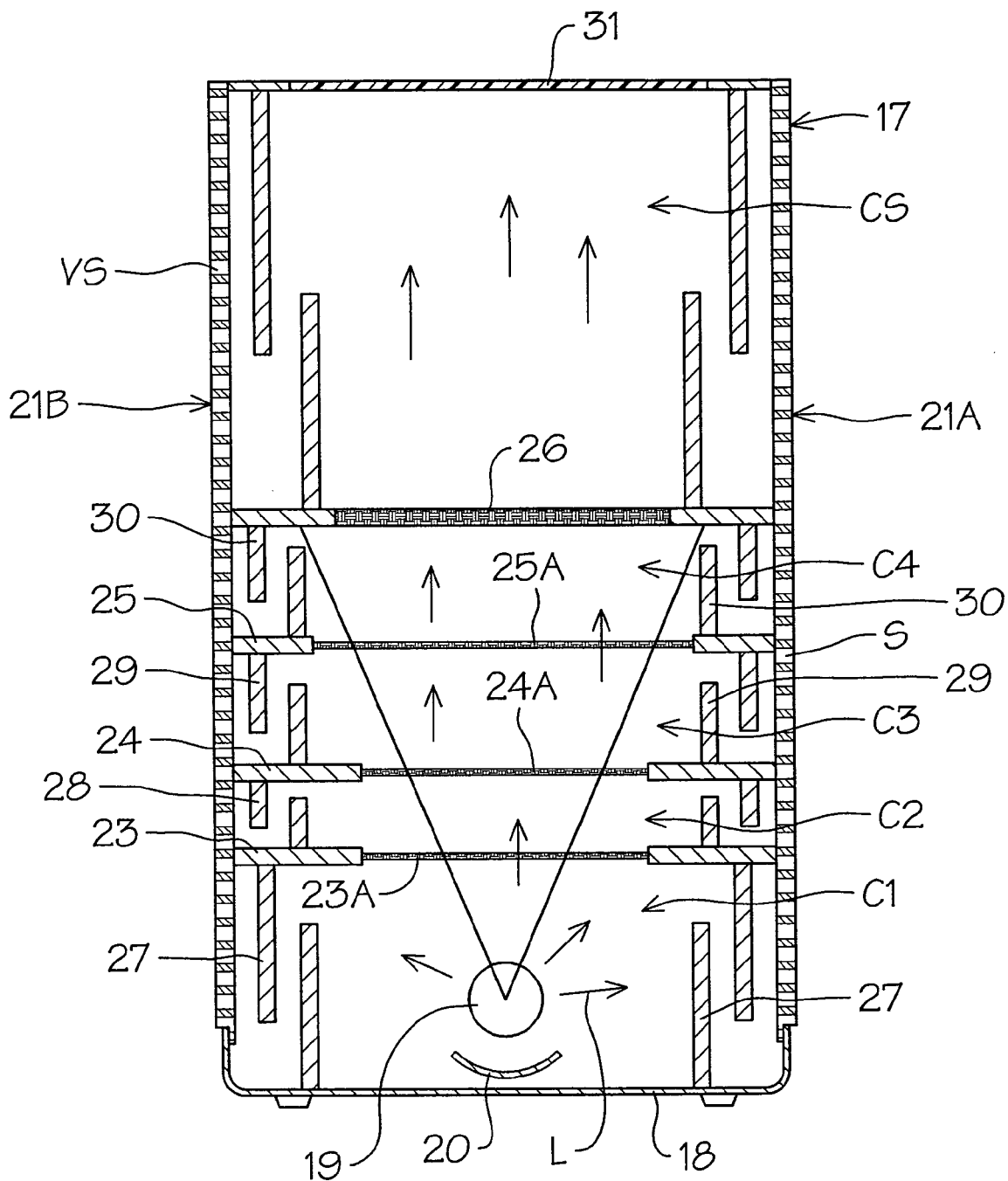
FIG. 2 is a schematic cross-sectional view of the convection cooling projector of the invention.

Referring now to FIG. 2 of the drawings, a detailed sectional illustration of an application of the convection cooling projector 10 is shown in the cross-sectional illustration wherein a projection enclosure 17 has a base support 18 with a projector bulb 19 and concave reflector 20 in spaced relation thereto supported thereby. Pairs of oppositely disposed upstanding sidewalls 21A and 21B extend from the base support 18 defining a multi-wall projection enclosure 22. The oppositely disposed sidewall pairs 21A have a plurality of spaced parallel venting slots VS therein in vertical spaced relation to one another. A number of thermal bulkheads 23, 24 and 25 extend between the respective wall pairs 21A and 21B. Each of the thermal bulkheads 23–25 has a central optical transparent insert 23A, 24A and 25A therein. The bulkheads 23–25 define multiple compartments within the enclosure 17 with the projector bulb 19 and reflector 20 in a first compartment C1 beginning at the base 18. The remaining compartments C2–C4 provide thermal isolation between the projector bulb 19 and an (LCD) panel 26.

Each compartment C1–C5 has two pairs of light baffles 27, 28, 29 and 30 respectively in spaced adjacent relation to the respective slotted walls 21A. The light baffles 27–30 extend from opposing bulk heads 23–26 and base 18 in parallel spaced overlapping orientation to prevent non-direct light indicated by light arrows L from passing directly out through the corresponding vent slots VS in each of the compartments C1 and C5 as hereinbefore described.

Figure 4:
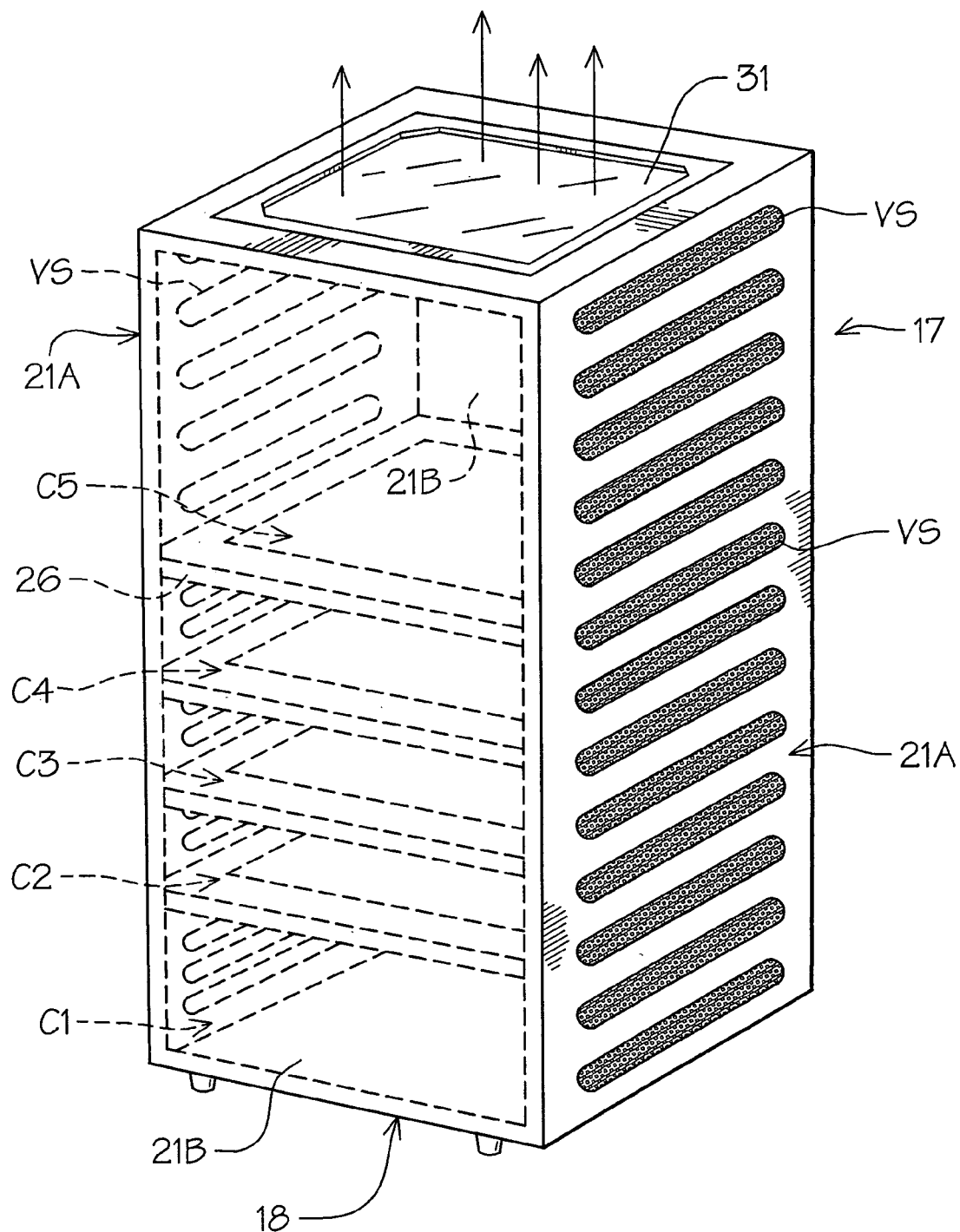
FIG. 4 is a perspective view of the convection cooling projector of the invention with a projection mirror attached thereto shown in broken lines.

It will be evident by referring to FIGS. 2 and 4 of the drawings that the space inbetween the bulkheads 23 and 26 is varied with the (LCD) panel 26 defining a final bulkhead. A projection lens 31 extends across the top of the enclosure 17 defined by the largest of the compartments C5 therein.

In operation, the low wattage bulb 19 of reduced heat output can be used within the assembly and heat generated thereby being dissipated by the convection air currents generated through the hereinbefore disclosed thermal isolation compartments C1–C5 and the multiple venting slots VS. It is important to dissipate the heat within the enclosure 17 given that the (LCD) panel 26 is heat sensitive and by the use of a lower watt low heat output bulb 19 the convection cooling imparted by the enclosure 17 of the invention is sufficient for maintaining the proper operation temperature without the use of a conventional fan (not shown). It will be evident that projection enclosure 17 can be created in reverse direction and still be functional.

Figure 3:
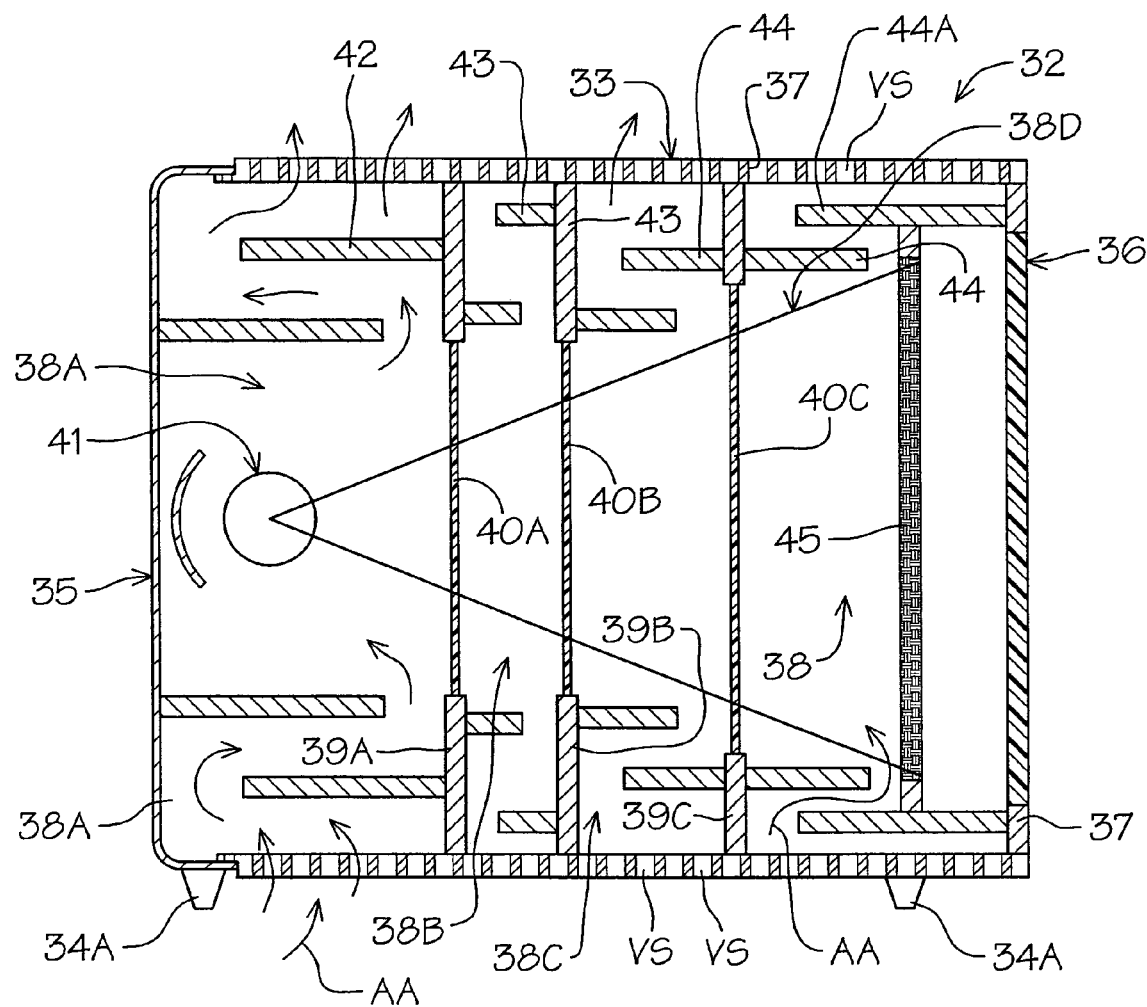
FIG. 3 is a schematic cross-sectional view of an alternate form of the invention on a horizontal orientation.

Referring now to FIG. 3 of the drawings, an alternate form of the invention can be seen wherein a horizontally oriented enclosure 32 is illustrated having a top 33 and support bottom 34 with support feet 34A. Oppositely disposed upstanding sidewall pairs 35 and 36 and a projection end wall 37 define the parameters of the enclosure.

The top wall 33 and bottom 34 have a plurality of spaced parallel venting slots VS therein which are in communication with a number of thermal isolation compartments 38A–38D. The compartments are defined within the enclosure 17 by thermal dividing walls 39A–39C each of which has optically transparent center inserts therein 40A–40C.

A projection light and reflector assembly 41 is positioned within the first compartment 38A as will be well understood by those skilled in the art.

Pairs of oppositely disposed light baffles 42, 43, 44 and 44A are arranged within the respective compartments 38A–38D in spaced parallel overlapping relation to the respective venting slots VS in the top and bottom walls 33 and 34 respectively.

An LCD panel 45 is mounted within the compartment 38D with a projection lens 46 in spaced adjacent relation thereto with the ventilation area there between so as to define in combination an effective end wall of the enclosure 32.

In operation for both the primary form 10 and the alternate form of the invention, an image is electronically reproduced on the respective LCD panels 26 and 45 as is well known within the art and light from the projector bulbs 19 and light assembly 41 respectively pass there through projecting an image through the respective projection lenses 31 and 36 which in this example, as noted, are Fresnel lenses.

It will be evident from the above description that during use a cooling convection air current is established through the enclosures 17 and 33 bringing in cool air through the respective side and bottom vents VS and exiting hot air through the opposite side and top vents 33 vents VS as illustrated by the air arrows AA.

In the primary form of the invention 10 a convection air current is set up and will allow air to be drawn in through the respective vents VS and the sidewalls 21A providing cross circulation to the respective thermal compartments as previously described.

Figure 5:
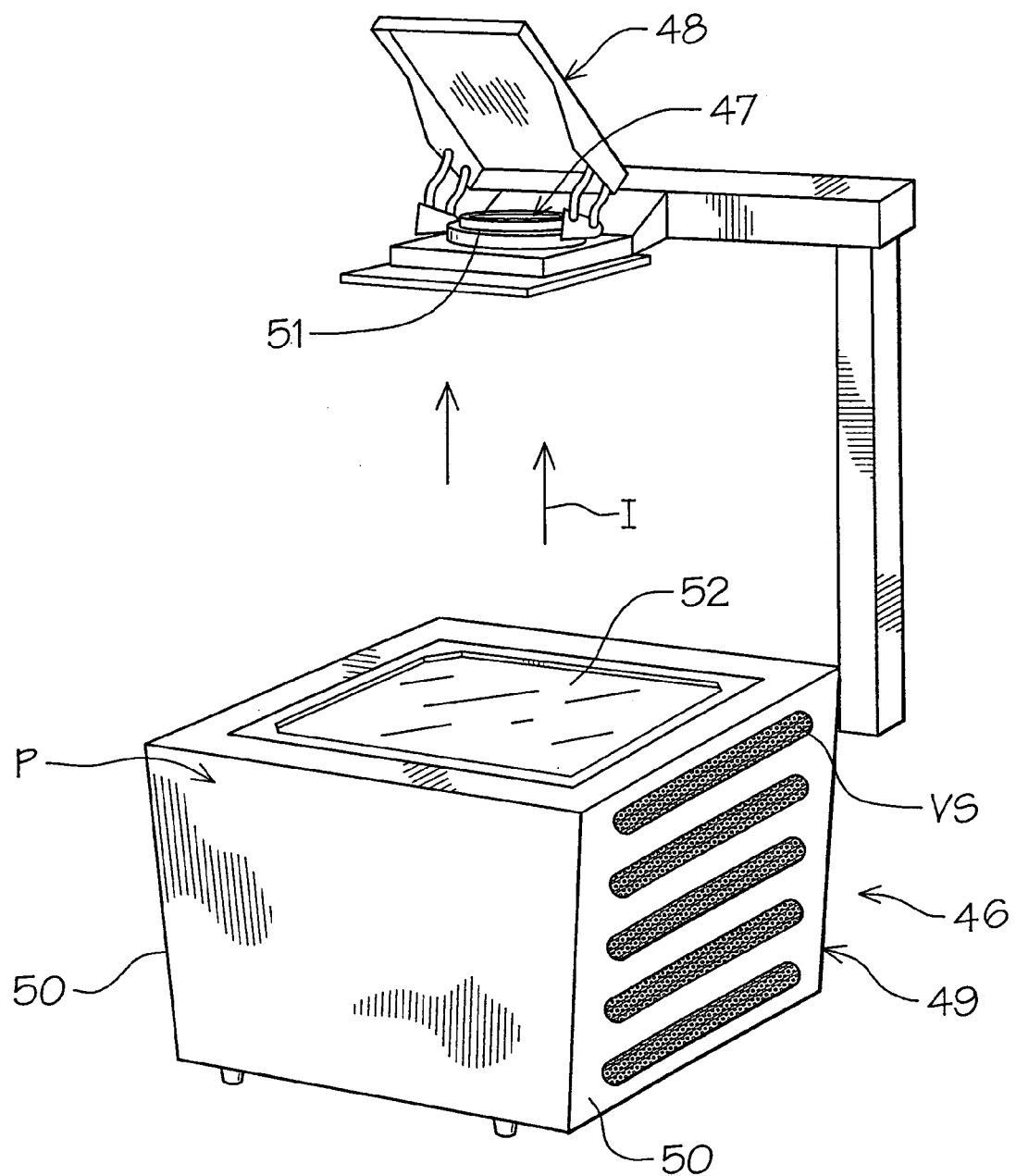
FIG. 5 is a perspective view of an alternate overhead projector of the invention having a convection-cooling configuration with a projection lens mirror assembly positioned in spaced relation to the projector's output for overhead projection onto a remote screen.

Referring now to FIG. 5 of the drawings, a second alternate form of the invention 46 can be seen having a secondary lens 47 and hinged mirror assembly 48 positioned in spaced aligned position with a projector P. An enclosure 49 has the same multiple thermal cooling chambers as the primary form of the invention with oppositely disposed slotted sidewalls 50 for creating a convection cooling current there through. Secondary lens 51 will allow a projected image I to be modified and reflected at angular inclination to the projector outlet surface at 52.

Figure 6:
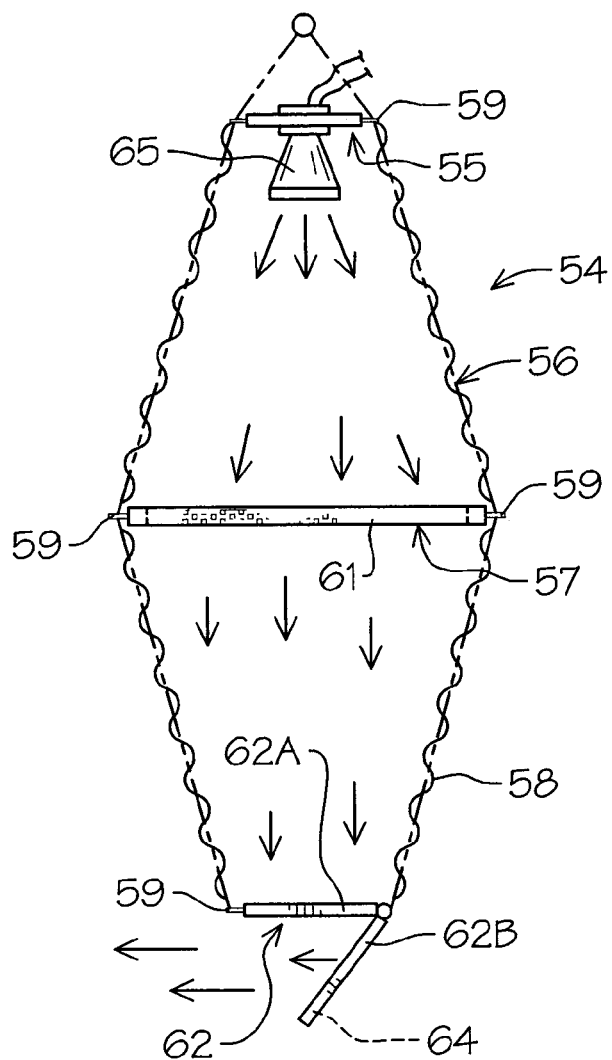
FIG. 6 is a side elevational view of a second alternate form of the invention.
Figure 7:
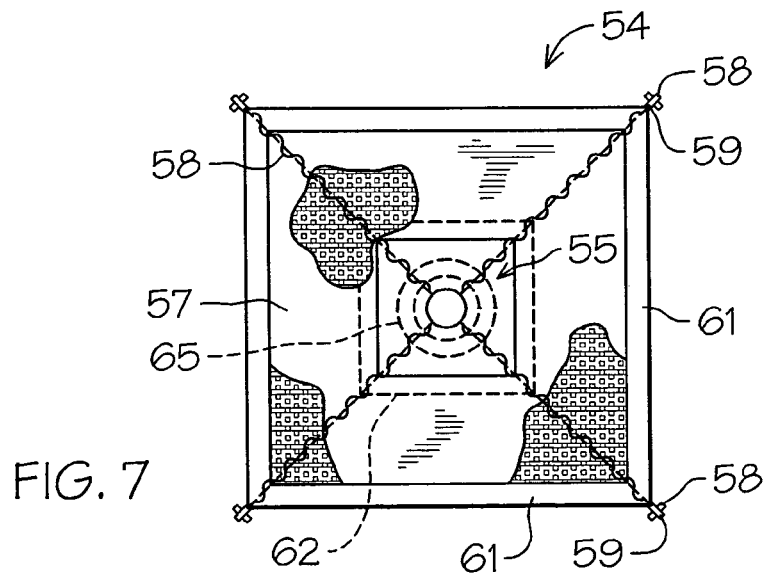
FIG. 7 is a top plan view thereof.

Referring now to FIGS. 6 and 7 of the drawings, a third alternate form of the invention can be seen wherein a hanging projector 54 can be seen having a light source and platform 55 supported by a plurality of support linkages 56 with an LCD panel 57 held in spaced relation thereto. The support linkage 56 is comprised of a plurality of cordage or other linkage construction such as metal chains which are secured to a plurality of opposing spaced parallel eyelets 59 extending from respective corners of the light source platform 56 and an LCD platform frame 61 in which the LCD panel 57 is positioned. An imaging and directional transfer assembly 62 is held in spaced vertical relation to the LCD frame 61 by the linkages 56 the imaging and directional transfer assembly 62 has a pair of square interengaged pivotal frames 62A and 62B with an optical quality mirror 64 secured within the frame 62B as best seen in FIG. 6 of the drawings. The projection principle is the same as that of the hereinbefore described primary and secondary forms of the invention in which the light source and platform 56 have a projector bulb 65 connected to a source of power with the image inducing LCD panel 57 within the LCD frame 61 to create an image which is then projected down to the angularly positioned optical quality mirror 64 and correspondingly projected onto a screen surface for viewing (not shown).

Figure 8:
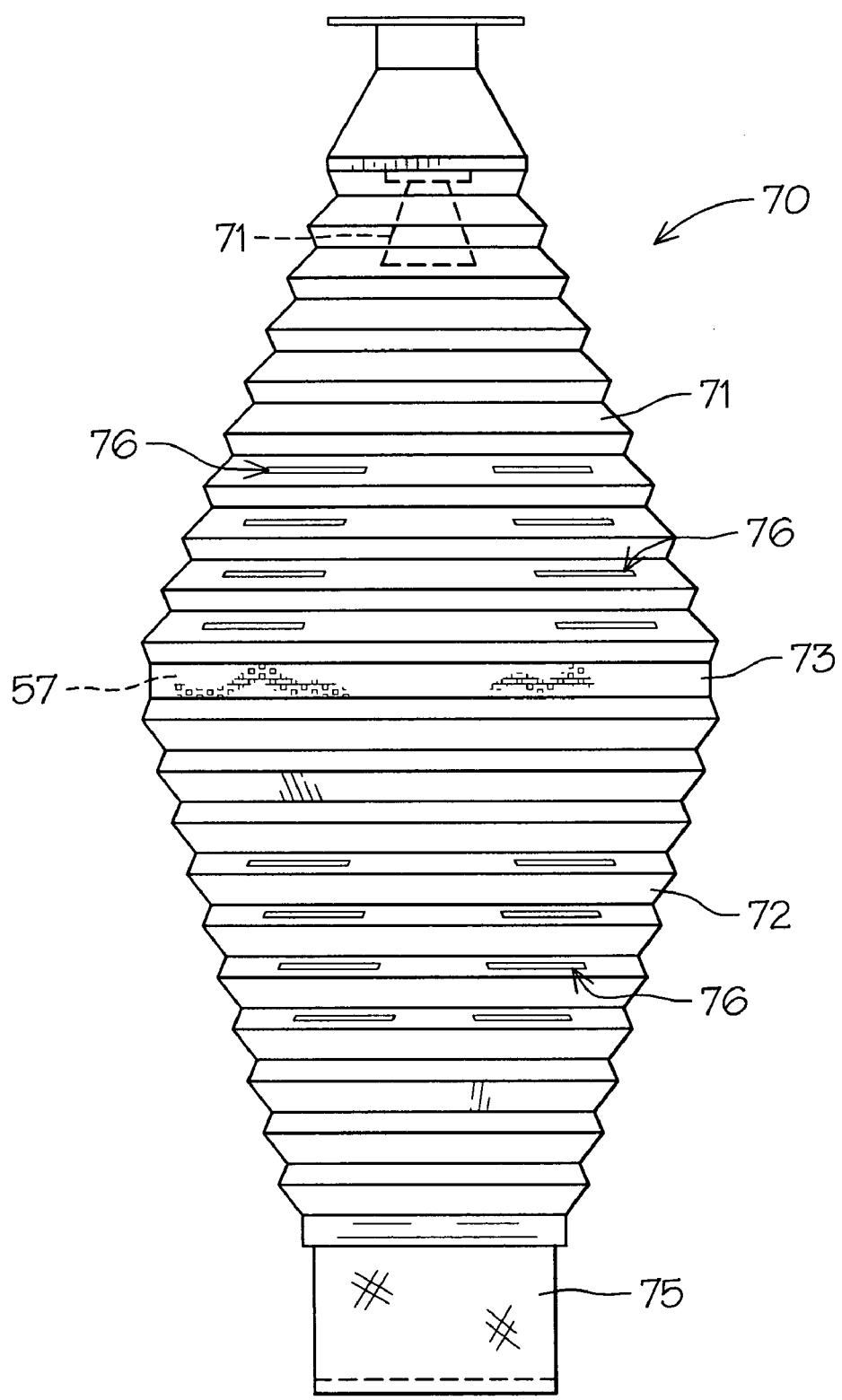
FIG. 8 is a side elevational view of a third alternate form of the invention in expanded use configuration.
Figure 9:
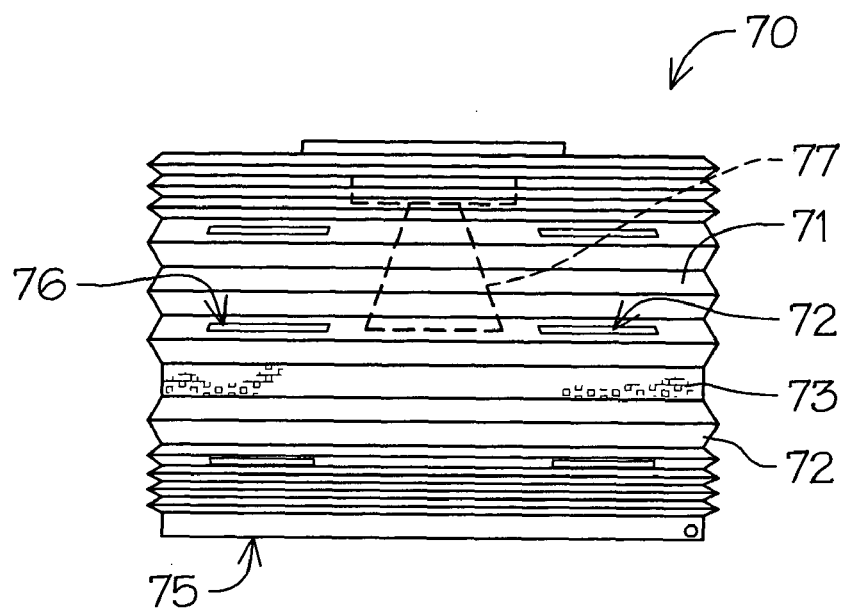
FIG. 9 is a side elevational view thereof in collapsed transportable and storage position.
Figure 10:
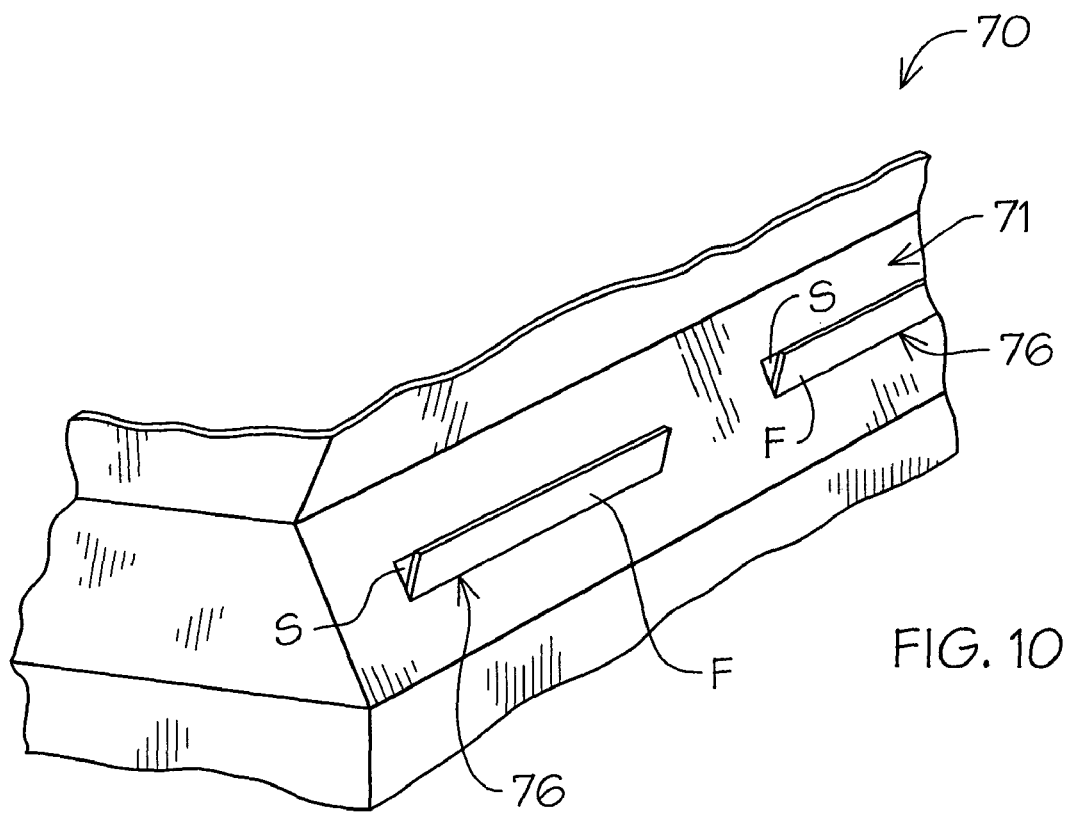
FIG. 10 is a partial enlarged perspective view of the cooling air inlets and outlet vents of the invention illustrated in FIGS. 8 and 9.

Referring to FIGS. 8, 9 and 10 of the drawings, a fourth alternate form of the invention can be seen in which a suspended projector 70 is illustrated having a pair of conical pleated fabric baffles 71 and 72 extending from a central LCD supporting platform frame 73. The baffle 71 has a light source and support frame platform 74 within at its free end. The baffle 72 has a pivoted mirror 75 and a support frame at its free end that will transfer the light image from the LCD panel 57 as hereinbefore described to a viewing surface (not shown). The respective baffles 71 and 72 may have a plurality of elongated slots and flap assemblies 76 within in both vertical and horizontally spaced relation to one another for cooling of a projection light source 77 and the LCD panel 57 as best seen in FIGS. 8 and 10 of the drawings. The slot and flap assemblies 76 have internal slots S each with a light baffle flap F formed there from so as to eliminate ancillary light impingement beyond the confines of the respective baffle and closure 71 and 72 as best seen in FIG. 10 of the drawings given the suspended projectors 70 baffled enclosures the slot and flap assemblies will provide for convection cooling thereof.

It will be apparent to those skilled in the art that such an alternate lens and mirror assemblies can also be used with the primary form of the projector 10, also a variety of other mirror and lens elements may be used to further process the projected image once it passes through the primary projector lenses.

It will be evident to those skilled in the art that various changes and modifications may be made therein without departing from the spirit of the invention.

Therefore I claim:
1. A convection-cooled projector comprises,
   a housing having a base, upstanding sidewalls extending from said base and a top,
   a liquid crystal display panel within said housing in spaced relation to said base,
   a plurality of thermal isolation walls within said housing between said liquid crystal display panel and said base, a plurality of aligned independent cooling compartments defined by said thermal isolation walls a projector light source within said housing for illuminating an image formed on said liquid crystal panel,
   said projector light source positioned between said base and said cooling compartments,
   a lens in one of said cooling compartments defining a projection surface,
   a plurality of ventilation openings in opposing walls incorporated within each of said independent cooling compartments and housing,
   light baffles within each of said cooling compartments and said housing independent thereof, said baffles define spaced overlapping elements extending from respective surfaces of effacing isolation walls and said liquid crystal panel support and said lens effacing surfaces, said light baffles in vertical alignment with each other in adjacent cooling compartments and said housing in spaced relation to respective ventilation openings.
2. The convection cooled projector set forth in claim 1 wherein said liquid crystal display panel, isolation walls and lens are in optical alignment with said projection light source.
3. The convection cooled projector set forth in claim 1 wherein portions of said thermal isolation walls are optically transparent and in parallel spaced relation to one another and said liquid crystal display panel and said light source.
4. The convection cooled projector set forth in claim 1 wherein said projection light source comprises,
   a light bulb and a reflector associated therewith.
5. The convection cooled projector set forth in claim 1 wherein said lens comprises a Fresnel type lens positioned between said light projector source and said liquid crystal display panel.
6. The convection-cooled projection set forth in claim 1 wherein said light baffles are optically opaque.

* * * * *